Oct. 29, 1968  J. A. VICTOREEN  3,408,460
METHOD AND APPARATUS FOR TESTING HEARING
Filed Aug. 24, 1967  2 Sheets-Sheet 1

INVENTOR.
John A. Victoreen
BY
J. V. Douglas
his Attorney

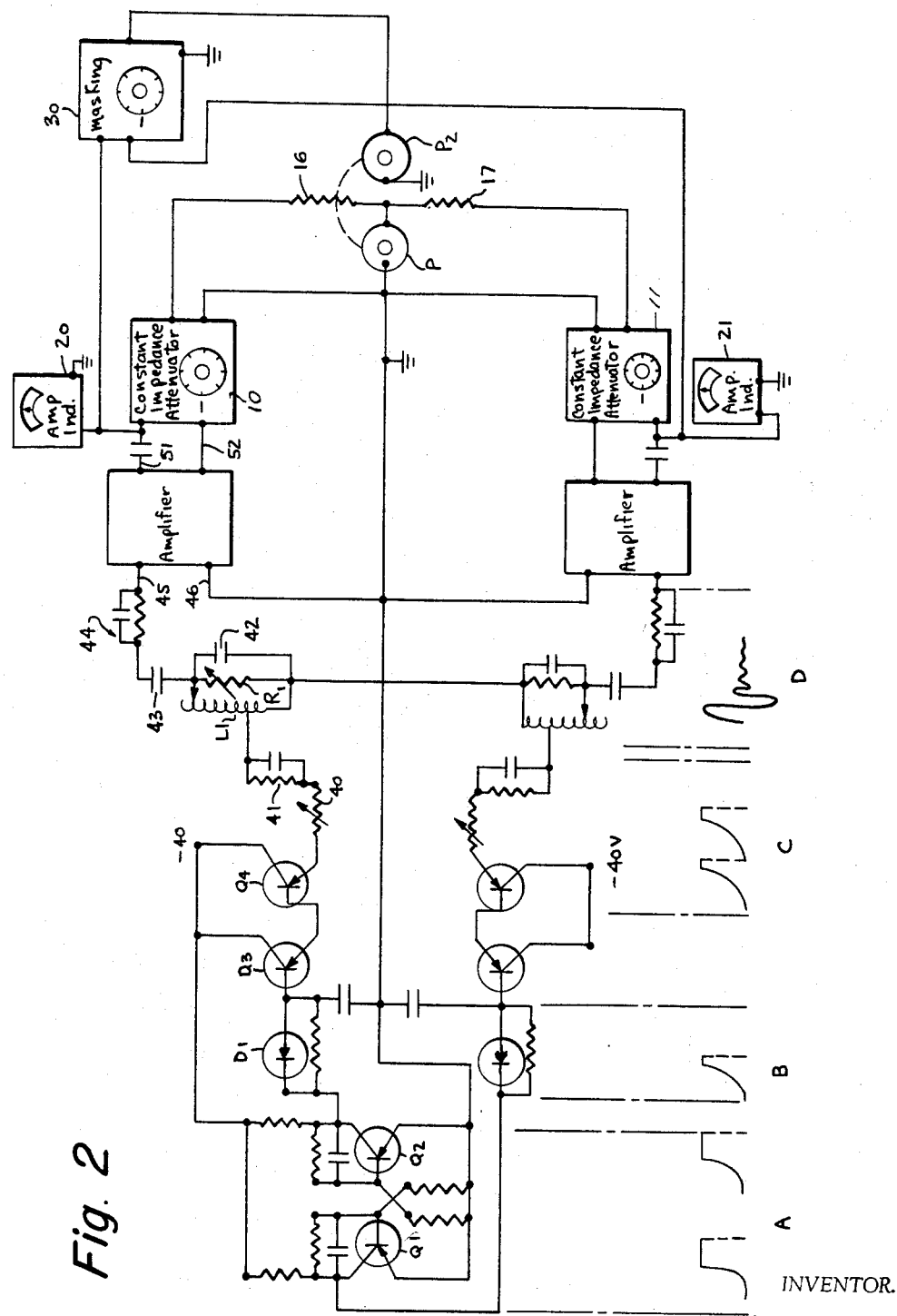

United States Patent Office 3,408,460
Patented Oct. 29, 1968

3,408,460
METHOD AND APPARATUS FOR
TESTING HEARING
John A. Victoreen, 350 N. Maitland Ave.,
Maitland, Fla. 32751
Continuation-in-part of application Ser. No. 330,144,
Dec. 12, 1963. This application Aug. 24, 1967, Ser.
No. 667,028
26 Claims. (Cl. 179—1)

ABSTRACT OF THE DISCLOSURE

Two series of audible pulses are generated, interposed equally in time, and applied through a single transducer to an ear to be tested, one series having a fixed amplitude and frequency, the other variable in both parameters. The amplitude of the variable pulses is varied for a given frequency until an audible sensation of even rythmic spacing is attained.

---

This invention relates to methods and apparatus for testing of hearing and for testing apparatus for the enhancement of hearing.

A first series of spaced wave trains are generated in the audio spectrum and a second series of wave trains of a different audio frequency are interposed between the trains of the first series. One of the series, which is a reference, is held at a fixed amplitude and the other series varied in amplitude until a sensation of equal loudness or rhythm of the two signals is obtained. The pressure values of the trains may then be recorded and the process repeated for the entire range of audio frequencies. This provides a graph of the residual hearing. The wave trains are short bursts of signals each burst containing the same number of cycles and preferably separated from each other such that one dies out before the other one starts and sufficiently closely spaced that the memory of one may be carried over to the next succeeding one. They may be damped or sinusoidal waves. Greatest accuracy of measurements appears to be obtained by damped wave trains.

The apparatus includes a pair of signal generators which are keyed off and on alternately. Each generator is coupled to a separate accurately calibrated attenuator. The input to the attenuator may be monitored. The signals from the attenuators are applied to a receiver, which is calibrated for the particular signal generating system and the signals applied to the ear by the receiver. The generated testing signal may also be used as a source of a masking signal for the other ear. Tests may be made for threshold of hearing, residual hearing, hearing acuity, and most comfortable hearing and equal loudness pressures.

This application is a continuation-in-part of my copending application Ser. No. 330,144, now abandoned, filed Dec. 12, 1963.

More specifically, this invention relates to method and apparatus for generating periodically varying sound pressures which are useful in acoustic measurements. It is particularly useful in conjunction with measurements of the response of the human auditory system and auditory devices. Although it will be described in conjunction with the provision of sound pressure waves for determining the sensitivity of the ear, now becoming known as the field of otometry, it is also useful in the design and investigation of audio equipment. In the field of otometry, it may be used in conjunction with the measurement of hearing for determining prosthetic requirements, for example, determining the proper prescription for hearing instruments which includes maximum deliverable pressure required from the instrument; gain required to deliver best audible pressures; and, the most desirable pressures required at each frequency.

Heretofore, in the testing of hearing, for the purpose of determining the hearing deficiency, audiometric measurements have been made for the purpose of determining the hearing loss. Such measurements are not useful for the prosthetic fitting of hearing aids because that measurement is of the hearing that is lost and is therefore made in terms of the degree of hearing loss instead of the absolute pressures required for best use of the residual hearing range.

For proper evaluation of the hearing, it is also necessary to know the threshold at which hearing occurs, which is known as minimum audible pressures, and the pressures at which intolerability occurs in order to define the useful hearing range. It is also desirable to present to the ear those sound pressures at various frequencies which produce eqaul loudness sensations. There is also a pressure or pressures at various frequencies which are preferred for listening purposes and these are not necessarily those of equal loudness.

Recently there has come into being a new type of measurement wherein the residual hearing range is measured and evaluated, which is known as the field of otometry. In otometry the objective is to determine the optimum pressure required at each frequency for most comfortable and intelligible listening and to enable the writing of a prescription for a hearing device to supply the pressures required. Obviously, the more objective the test can be made, the more accurately the ideal prescription can be realized and provided. It then follows that ultimately the client is better served.

Heretofore no suitable instrument has been available for otometric measurements. Up to the present time audiological and audiometric instruments have been based upon the use of pure continuous tones which present many cycles; these produce subjective errors which make accurate objective measurements impossible. The use of pure continuous tones provided a fixed time interval of presentation containing a number of cycles which varied with frequency, whereas the present invention provides a constant number of cycles at each frequency presented over a varying time interval.

By the present invetion, it is possible to make sound pressure measurements of ear sensitivity which eliminates many subjective complications. For example, it is difficult for the normal individual to accurately evaluate the relative loudness of two separate pure tones.

It is, however, possible to apply two frequencies in rapid alternate succession without the musical sensation of a single sound, thus making relative comparison possible. One of the most difficult tasks in hearing evaluation is to provide a test for pressure sensitivity at a given frequency which does not elicit confusing sensations of musical appreciations.

It is possible by this invention to accurately determine relative pressures required to produce equal loudness sensations. This I do by removing or minimizing the perceptible tonal properties.

By the present invention it is possible to test the hearing of an individual in such a manner that the testing does not cause appreciable fatigue of the auditory system. This I do by supplying short intervals of the particular frequency being used for testing.

One of the reasons why pure tones have been used universally is that they are monochromatic, easy to generate, and contain but a single frequency. It has generally been thought that any modification of a pure tone, such as would be produced by a damped wave train, would have a spectral distribution containing other and undesirable frequencies. While this may mathematically be the case, surprisingly enough it does not appear to exist as a deleterious factor in the determination of many audible effects. Indeed, the difference in effect produced by a monochromatic tone and one having a predetermined spectral distribution is an index to the operation of a particular ear. Thus, this method becomes a valuable adjunct to previously accepted practices.

Briefly, the invention contemplates the generation of bursts consisting of wave trains having a desired decrement which may be 1.0 or less. A damped wave train representing the variation of pressure with time, such as contemplated here, is preferably utilized as in contrast to the previous undamped wave trains for several reasons. Among the reasons may be included the fact that it has the unique property of determining recognizable pitch without appreciable tonal association. Another is that it minimizes the generation of sustained resonances, either acoustical or electrical. Another, that it minimizes undesirable transients when it is started or ceases as in contrast to the starting and stopping tone transients which occur when a continuous pure tone is interrupted. Another, that as a particular burst, it gets through or is not as easily masked by ambient noise or tinnitus and thus permits the determination of an accurate threshold in the presence thereof. It also almost perfectly represents the sound pressure cycles occurring in speech and therefore the conditions under which an ear operates in practice. It also is more nearly a natural kind of sound most usually encountered by the ear and with which the ear was designed to operate. Like a pure tone, it is also specifically definable and reproducible when its decrement is specified.

One mode of operation consists in the use of these waves in the form of discrete trains, where each has a different frequency, but should be the same number of cycles or of equal decrement.

The wave trains produced by the above device, having a decrement within the range stated, are particularly useful because they die out between pulses and thus tend to prevent the formation of standing waves. The frequency of the wave trains will, of course, be selected such as to make measurements possible. Measurements may also be made in the presence of relatively large ambient noise level.

More specifically, these bursts may also be presented alternately and at known sound pressure. The pressure of one of the series of pulses is then varied until a sensation of equal loudness is obtained which may also give a sensation of rhythmic sound with apparent equal spacing. This almost completely eliminates the subjective determination of loudness itself and results in an objective determination of high accuracy and reproducibility regardless of the character of the individual being tested.

Still other advantages of the invention, and its mode of operation, will become apparent from the following description of an embodiment thereof which is illustrated by the accompanying drawings and forms a part of the specification.

In the drawings:

FIG. 2 is a diagram illustrating in detail the new aspects of the invention and showing by blocks certain of the parts which are used in conjunction with the invention but which are conventional in the art.

Figure 1:
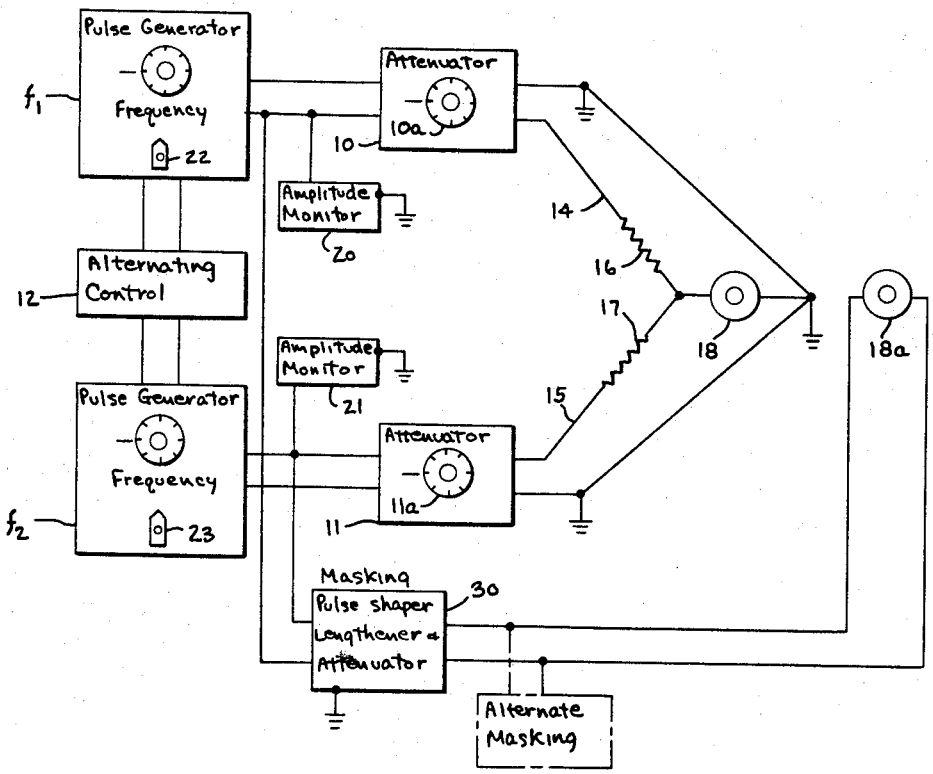
FIG. 1 is a block diagram illustrating an apparatus which may be used to practice the invention.

Referring now to the drawings, wherein like parts have been designated by like reference characters, and more particularly to FIG. 1, the apparatus contemplates a pulse generator $f_1$, which is a generator that will generate a predetermined rate of rise and of pressure. This may be a generator which will generate damped wave trains of a predetermined frequency and decrement which is selected as the standard and the output of which may be set to a predetermined known amplitude. The control of the amplitude is preferably realized by using a separate attenuator 10, although it could be effected in the generator itself. Although it is contemplated that damped wave trains be generated, it is possible that in some instances undamped wave trains or other sound bursts will be used. The most desirable bursts will be those which elicit the least tone sensation. Preferably these will have a damping increment, or decrement, such that when repetitive cycles are used each succeeding cycle of the wave train is reduced by a factor which causes the wave train to die out before the next wave train starts or reduces to a point where it is unimportant. The repetition rate of the bursts presented should be such that it is just below that which in itself would produce a pronounced sensation of tone. This could be ten bursts per second.

It is apparent that when damped wave trains are used the decrement and the repetition rate should be correlated so that the repetition rate provides sufficient time for the preceding wave train to diminish to a desirable value before the next one starts. Thus the decrement could possibly vary depending upon the repetition rate and frequency.

A second pulse generator, $f_2$, is provided and it constitutes a device which will generate sound pressure bursts similar to that provided by $f_1$, which may be wave trains of suitable decrement, of frequencies which may be varied within the audible range. I have found a range from 100 to 10,000 cycles to be satisfactory, although it will be apparent that this may be extended, contracted or varied. The amplitude of the signals may also be varied internally but are preferably by a separate attenuator 11. It is important that same type of sound pressure burst be generated in both $f_1$ and $f_2$.

The two generators $f_1$ and $f_2$ are energized and activated by a control 12, whereby the generators are alternately energized sequentially in the proper time relation. The outputs from the attentuators 10 and 11 are connected by the lines 14 and 15 and common ground through impedance matching resistors 16 and 17 to a phone or receiver 18. Manual switching means may be substituted for the automatic switching means.

The input from each of the generators to the attenuators is maintained at the same potential which is determined by the means of peak signal monitoring devices 20 and 21, each generator being adjustable as to output by an amplitude control such as 22 and 23. One single generator may be used to provide different frequency signals to each of the attenuators.

The attenuators 10 and 11 may be adjusted by the controls 10a and 11a through a range from 0 to 120 db of sound, re .0002 microbars.

A manner of operation contemplates that the generator $f_1$ be set to provide a signal of selected reference frequency, which, for example, may have a fundamental of 1000 or 1500 cycles per second, and when it is a damped train, with a decrement of about .9 and a repetition of 10 pulses per second to provide a peak pressure at any selected pressure level to be tested. The generator $f_2$ is then set at a desired frequency which may be above or below the standard frequency $f_1$ but within the audible range with a similar decrement and repetition rate. The two generators are then turned off and on by the alternating control at equal successive intervals. The electrical output of the two generators is monitored to provide equal input to each attenuator. The attenuator 11 is moved to attenuate the signal to produce a sound pressure at the transducer which is different than that of the other. The client has the head phone applied to his ear. The attenuator 11 is then changed to increase or decrease the sound pressure.

Assuming that the presure is lower at the start, the client hears a series of regular "clicks" representing a standard sound pressure from the generator $f_1$ and attenuator 10. As the attenuator 11 is changed to increase the sound pressure from generator $f_2$, the client eventually begins to hear a series of apparently irregular "clicks" without equal emphasis. He can easily determine what is being heard, because the series of clicks heard at the beginning now has interposed therebetween additional clicks which cause a sensation of non-rhythmic series clicks, giving the impression of varied or uneven spacing. As the attenuator 11 is changed to raise the pressure, a point is eventually reached, relatively sharply, where the spacing appears to be equal, or have equal emphasis which represents a condition of equal loudness pressures as far as the individual ear being tested is concerned. When the attenuator 11 is adjusted to further increase the pressure, the client will sense the apparent change in spacing, emphasis, loudness or rhythm of the sound, which indicates that the critical point has been passed.

It is apparent that the client can inform the otometrist of his sensations and the pressure adjusted until the sensation of rhythm, equal spacing, loudness or equal emphasis is obtained. At this point the otometrist can read the exact value of sound pressures from the dials 10a and 11a of the attenuators. These values are now recorded on a suitable chart. These points can be determined to an accuracy of ±1 db.

The process may be repeated for any selected audio frequencies and pressures throughout the useful audio frequency range and the information obtained therefrom entered on a suitable otometric chart that may be used to visualize the operating characteristics of the ear.

It will be apparent that in the use of the device of FIG. 1 that the receiver 18, for proper results, must be one which produces equal sound pressures in the ear canal for equal electrical potentials applied over the various frequencies that are used. Heretofore it has been customary to design such phones by applying pure tones to the phones at various audible frequencies from which a response curve could be made indicating the response of that particular phone throughout the range. When such a phone is used, there is inserted into the circuit with the phone suitable compensating means to provide a substantially equal sound pressure output to each frequency. Such a calibrated ear phone does not usually give equal response to short transient wave trains of the same frequencies as the pure tones. Hence, since the contemplated use of the phones is in conjunction with means for the enhancement of hearing and the sounds heard include components which are much more apt to be of a transient nature than pure tones, the reproduction thereof suffers.

In addition, there is a variance between individual ear canals. It is therefore difficult to predict accurately ear canal pressures even when a calibrated external earphone is used with continuous pure tones. When a suitable pressure burst, such as described before, is used these effects can be reduced. Ear canal pressures can then be predicted from "flat plate" coupler measurements of the earphone when the proper pressure correction factor is used in combination with the coupler calibration.

The above apparatus of FIG. 1, or a part thereof, is ideally suited for the design or a calibration of receivers, phones or transducers. The electrical wave train produced by $f_1$, the amplitude monitor 20, and the control by the attenuator 10 to provide a constant output, is provided directly to the earphone or receiver. The earphone is coupled to a suitable microphone by a suitable coupler. The microphone is connected to a peak voltmeter, oscilloscope, or both. Measurements are then made at constant input amplitude to the earphone at various frequencies. From these, a curve may be drawn showing the acoustic output from the receiver. If the receiver response shows variations in output with frequency, then compensating circuits may be inserted between the output and the receiver or the parameters of the receiver itself changed until the acoustic output does not vary appreciably with frequency.

The above device having a receiver or transducer which provides a constant acoustical output with changes in frequency, may also be used for free field testing. Heretofore such testing has been done by generating undamped wave trains. Undamped wave trains used for such work are useless unless the measurements are made in an anechoic chamber.

The invention is also useful in determining a series of pressures for the ear which determine the optimum pressure level for most desirable hearing acuity. In this instance, a series of bursts having two different frequencies, equally and alternately spaced at equal or a fixed difference in amplitudes, are generated. Both signal amplitudes are varied simultaneously in the same direction to increase or decrease both amplitudes, while maintaining the amplitude difference until the client subjectively determines the point where the sensation of best audible pressures or more comfortable hearing is obtained. For instance, it is relatively easy to determine the threshold of hearing for at certain reduced pressures a signal will apparently become too weak to be heard. When the signals are raised, there comes a point where the amplitude of the signals of equal pressure at all frequencies provides an apparent equal intensity and rhythm. There is also a place where the pressure is so high that the useful limit of the ear is reduced, so far as determining relative loudness with pressure is concerned. This may be considered the upper useful limit, because at or near this point discomfort occurs. Obviously, the pressure for most desirable hearing or best audible pressure is somewhere in between the two extremes. Due to the fact that there are two signals of different frequency, the client is forced to an objective view of that point where the signals are most acceptable continuously, because a comparison of the relative effort required to hear the two signals is offered.

The invention is also useful in supplying signals for determining preferred listening pressures. In this instance only the upper or lower portion of the circuit would be used, at which time it would be used as a single signal generator. The audible sound pressure bursts are fed to the ear and the amplitude varied until the client determines the most preferable pressure at one or several frequencies. The peculiarity of the signal is that the control of the rise time, the time duration and the rate of change with time, while maintaining a constant relationship between these parameters, provides a signal whereby the desirable pressure can be sharply determined.

The device is also usable for determining the threshold pressures of the ear, for the difference between thresholds obtained by the predetermined control of rise time of the bursts and thresholds obtained from continuously repetitive tones, as in pure tone audiometry, give an index to the performance of the ear. This is particularly useful in conjunction with individuals who do not have the ability to recognize the existence of a pure audiometric tone. The amount of tinnitus existing in a particular ear is reflected in the levels at which thresholds are perceived.

It is recognized in this art that in the testing of hearing where there is a difference in hearing between the two ears, that in testing the more deficient ear, masking of the better ear is necessary if accurate measurements of the least sensitive ear is to be obtained. It is recognized that a similar tone to the test tone is not desirably used for the masking signal because it is difficult to tell the difference between the two. Heretofore masking was effected by providing white noise or other noise of wide spectral distribution of sound, continuously to the better ear. In some instances filters were used to decrease the band width but retain sufficient signal as to be effective at the test frequencies. This required a separate and independent generator. It also resulted in fatigue of the person being tested for much energy was supplied which was of no value in the masking process.

It will be appreciated that previous forms of masking tones may be used in conjunction with the improved test signal of the present invention and superior results attained because of the ability to differentiate the test signals in the presence of the masking tones.

However an improved form of masking can be obtained without a complete independent generator and wherein the results are far superior to the above and less fatiguing on the client. Unlike the other masking tones which have an indeterminate comparison at different frequencies, the present invention provides a constant spectrum relationship at all frequencies.

The present invention enables a masking signal to be derived from the test signal which is entirely satisfactory. Such a signal is obtained by feeding the output from the pulse generators $f_1$ and $f_2$ into a unit 30 which includes a pulse shaper, which by shaping the pulse extends its band width; a lengthener, which extends the duration of the pulse: and, an attenuator, to provide pulses which are of the same frequency and in synchronism with the test pulses and to distribute the major part of the pulses energy at the test frequency with any band spread which may be desired. The output from the masking section is connected to the other earphone 18a. It is preferred that the energy be confined within a band sufficiently narrow and yet wide enough to mask the test signals and of duration at least as long and probably longer than test pulses.

It is possible to eliminate the impedance matching network 16–17 and put each of the signals from each of the attenuators into a separate earphone. By this means it is possible to make loudness balance tests between the two ears.

One form of a basic circuit which may be used will be described in conjunction with the generation of pulses which, in this case, are damped waves, is comprised of a multivibrator, the opposite sides of which are connected to two separate but identical circuits wherein the two signals are each shaped and used to generate damped wave signals, amplified, monitored and then attenuated and finally recombined and applied to a receiver. It will be appreciated that waveforms of other types could be generated by apparatus other than shown, whereby the broader aspects of the invention could be realized. It has been determined that the important part of the signal is the rate of change of the rise time, and a constant number of cycles at each frequency. Under these circumstances it would be possible to provide signals having other characteristics as long as the integrity of the rise of each succeeding cycle is retained within each burst.

The circuit diagram of FIG. 2 shows in greater detail the circuitry by means of which all of the above noted results may be obtained. At the left there is shown a free-running multivibrator having the transistors $Q_1$ and $Q_2$, the time constant being determined by the resistance and capacitance and which, as stated, may be of the order of 10 cycles per second. The wave shape within the circuit is determined by the transistors and condenser. It receives its power from a source not shown but indicated as ground and —40 v. The particular form of multivibrator circuit is well known in the art.

The output from the collectors of the transistors $Q_1$ and $Q_2$, as shown at A, is substantially a square wave and, although there may be some deterioration in the rise time of the trigger signal, the cut-off is extremely rapid and it is this which initiates the final acoustic output. It should be noted that the outputs from the ringing circuits are pulses, or bursts first from one side and then the other. The collectors $Q_1$ and $Q_2$ respectively, each connect to a separate charging pulse shaper, then, in cascade, each circuit includes an impedance matching device, a charging unit and switch, a ringing circuit, an amplifier, a monitor, an attenuator, and the controlled output combined in an output matching circuit which is common to both circuits. The circuits, other than the multivibrator and output matching circuit, are completely independent of each other but may be of substantially identical design; therefore only the upper of the two circuits will be described.

The transistors $Q_1$ and $Q_2$ can be of a suitable type. The collector of $Q_2$ connects to the anode of the diode $D_1$ in the upper circuit, the elements of which are shunted by a resistor supplemented by a condenser connected to ground, the value of which determines the repetition rate. Likewise the collector of $Q_1$ connects to the diode in the lower circuit in the same manner. This provides a non-oscillatory pulse shaping circuit which decreases the slope of the rise time of the pulse so that it is more nearly a saw-toothed wave of varying potential and provides a plateau at the top and bottom of this wave, as shown at B. The diode connects to the base of the transistor $Q_3$ which is there solely for the purpose of impedance matching, the emitter of the transistor being connected to the base of the charging transistor $Q_4$. The collectors of transistors $Q_3$ and $Q_4$ are connected to —40.

It will be appreciated that the diagram being described is of a basic nature and that in actual practice with variations in types of transistors, decoupling and clarity.

voltage reducing circuits would be included as would be well known to those versed in the art but which are omitted from this particular diagram in the interest of clarity.

It will be obvious that for the voltages given, transistors will be selected which will be operable in the circuit as shown.

The transistor $Q_3$, as stated, was an impedance matching transistor to prevent the application of too great a load to the multivibrator. The signal from transistor $Q_3$ is connected to the base of transistor $Q_4$, which acts as a potential operated charging circuit and switch. The emitter is connected through an amplitude control 40 and a bias means 41 consisting of a resistor and condenser which, in this case, in turn is connected to a tap on a variable inductance $L_1$ of a ringing circuit when a damped wave train is desired. The parallel resistor and condenser combination 41 biases the transistor $Q_4$ beyond cut-off. When the base potential is reduced to the cut-off point, the oscillatory discharge of the ringing circuit applies a base potential of sufficient amplitude to raise the base to the conducting region. When the signal from the pulse shaper rises slowly to its peak value and holds at the upper plateau, the current developed in the transistor is applied through the variable control and the bias resistor and capacitor to a tap on the coil in the ringing circuit. This causes the ringing circuit to be charged to a predetermined value, along with the bias circuit (resistor and condenser 41). When the signal drops to zero, which it does very rapidly, the base potential is determined by the retained potential of the bias circuit (resistor and condenser). This potential must be greater than that produced upon reversal in the oscillatory ringing circuit to prevent the base from being periodically driven into the conducting region of the transistor. Thus current from the transistor into the ringing circuit is effectively cut-off and the resultant load upon the ringing circuit is negligible.

The ringing circuit, in this particular instance, is shown as an inductance $L_1$ which may be varied by an adjustable tap to change the inductance, one end of the tap is connected to a condenser 42 shunted across the conductance. The lower end of the ringing circuit is connected to ground. The decrement of the ringing circuit is controlled either by its inherent resistance or by additional variable resistance $R_1$ shunted across the condenser, thus damping is made variable. For the purpose of this explanation, however, it will be considered that it provides a decrement in the ringing circuit in the damped wave of between .9 and 1.0.

It will be appreciated that the rate of rise of the oscillatory burst with the above circuit is approximately sinusoidal.

Suitable electronic circuits containing only resistance and capacitance could be substituted for the ringing circuit shown making it possible to create undamped tone bursts starting and ending at zero potential and having an equal number of cycles.

The upper end of the ringing circuit is connected through a coupling condenser 43 to a frequency compensating network 44 consisting of a parallel resistor and condenser, which constitutes, along with the ground, the output terminals. The output then connects to the input terminals 45–46 of an audio amplifier. The audio amplifier may be a conventional transistor amplifier having a push-pull output. The output is taken from the emitter and collector of the power transistors through the line 51, through a coupling condenser in the line 51 and applied to the input of the attenuator. The other line 52 connects to the grounded side of the amplifier and then to the input of the attenuator. In the interest of clarity, this is shown as a fixed attenuator but in practice it is constant impedance attenuator capable of controlling the input to the receiver in 2 db steps from 0 to 120 db.

The output from the attenuators is connected through the impedance matching resistors 16 and 17 to one side of the receiver or phone P, the other side of the receiver being connected to ground.

As previously stated, it is necessary that the input signals to the attenuators be of a predetermined amplitude. In this instance, signals of 10 volts peak may be desired. The amplitude is controlled by the amplitude control in the emitter circuit of $Q_4$. The exact amplitude is determined by the amplitude indicators 20–21 connected to the input sides of the attenuators between the junction of this input and the coupling capacitor.

It was also stated that in some instances a masking signal was desired. In this case the masking signals are also obtained at the output side of the coupling capacitors in the output of the amplifier and ground from each section and are fed into a pulse shaper, amplifier and attenuator 30, the output of which is connected to the other receiver $P_2$ of the pair of head phones.

Figure 3:
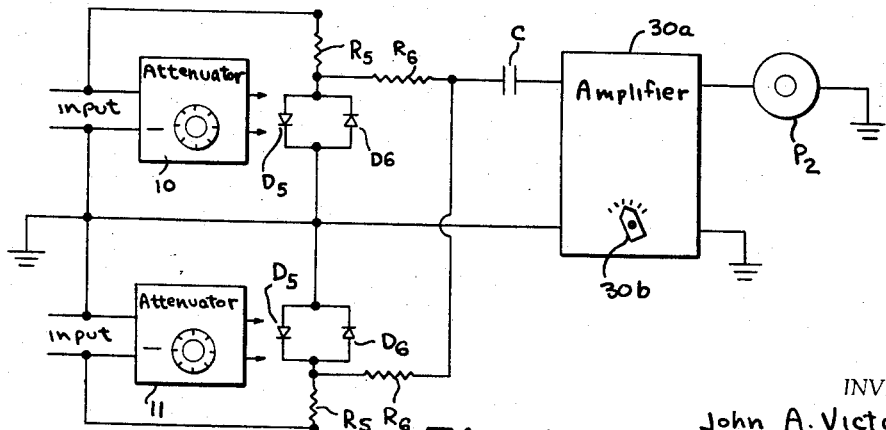
FIG. 3 is a diagrammatic view of a masking system.

FIG. 3 illustrates a form of masking device particularly suitable for accomplishing the above results. As stated, the independent signals are taken from the input to the attenuators 10 and 11 and each applied to a potential divider comprised of a resistance $R_5$ as a first element and a pair of diodes $D_5$ and $D_6$ disposed in parallel and back-to-back as a second element. The other side of the diodes are connected to ground. This provides a bi-lateral, non-linear voltage limiting resistance. The resistors $R_5$ drop the voltage and cause the diodes to operate in the non-linear region of forward conductance. This results in a full wave signal being obtained from across the diodes which is reduced in amplitude by the resistance ratio of the divider and maintained in amplitude by the voltage limiting characteristics of the diodes in their forward direction. The resistance characteristic of the semi-conductors $D_5$ and $D_6$ are so chosen that the voltage limiting character is not sharply defined, to provide a smoothly attenuated signal. This results in an increase in band width of the signal which is generated and the band width which is produced may be altered by changing the parameters of the voltage divider and by using diodes of different characteristic. The diodes may also be omitted when a synchronous narrow band masking signal is desired.

The signals are then taken from the junction of the resistors $R_5$ and the diodes, through resistors $R_6$, which are impedance matching resistors and which also reduce the load across the diodes and isolate the signal sources from each other when two signals are used. The combined output from the resistors $R_6$ and ground is then applied through a coupling condenser C to a conventional amplifier 30a under control of an amplitude control 30b and applied to the head phone $P_2$.

The overall result is a signal at the head phone which has the same periodicity and follows the original signals and wherein the fundamental frequencies are the same as the testing signals, but have added thereto other frequencies to provide bands of increased but limited width. The phase relationship between fundamental frequency of the test signal and the masking signal are also maintained in synchronism or in fixed phase relationship with each other. The amplitude remains constant in the presence of frequency changes. Since the signal occurs in pulses in timed relation to the original signals, there are periods in between the pulses, when there is no signal and none is needed because there is at that time no signal to the ear being tested.

This provides less distraction to the client and enables testing to proceed quicker and without the fatiguing effect commonly found in steady "white" noise.

It is pointed out that although the masking system is particularly useful in conjunction with the generating of masking signals from damped waves, that it can also be used to advantage with waves that are undamped. In such case a pure tone could be masked by using the pure tone as the signal source and the effect of the diodes would be to increase the band width but not to such an extent that the range would be considerable. If it is desired to increase the band width in either of the above instances, the limiting action of the diodes can be made sharper.

Having thus described the invention in an embodiment thereof, I am aware that numerous and extensive departures may be made therefrom without departing from the spirit or scope of the invention as defined in the appended claims.

I claim:

1. The method of testing the hearing of an individual which comprises generating, for a comparison of loudness, a pair of acoustical signals of different frequency each comprised of a series of wave trains of predetermined audible frequency, the trains of each of said pair being interposed in time between the trains of the other of the pair, and applying said signals to the ear under test and varying the amplitude of one of the signals to provide a specific audible sensation.

2. The method as described in claim 1, wherein said wave trains are damped wave trains.

3. The method as described in claim 2, wherein said wave trains have substantially equal decrement.

4. The method of testing the sound pressure sensing ability of the ear of an individual which comprises generating a first series of wave trains at a predetermined frequency within the range of the ear and having a predetermined repetition rate and amplitude to provide sound pressures, applying said sound pressures to the ear to provide a series of equally spaced sharp audible sensations, generating a second series of wave trains which may be varied in amplitude at a frequency within the range of the ear and at same repetition rate as the first series of wave trains and at spaced intervals between the trains of the first series and of selected amplitude to provide sound pressures that are applied to the same ear to provide a second series of equally spaced sharp audible sensations, said second series of wave trains being varied in amplitude relative to the first wave train to provide a specific audible sensation.

5. The method as described in claim 4, wherein said wave trains are damped wave trains.

6. The method as described in claim 4, wherein said specific audible sensation is one of even rhythmic spacing.

7. The method as described in claim 6, wherein said wave trains are sinusoidal waves without transients.

8. The method of testing hearing by applying to an ear sound pressures obtained by generating a first series of wave trains in the audio spectrum and a second series of wave trains at a different frequency in the audio spectrum, each train having a predetermined spectral distribution, interposing the wave trains of the two series between each other, maintaining one of said series at a fixed amplitude and varying the amplitude of the other of said series until a sensation of equal spacing is obtained, recording the pressure values of each of said trains, repeating the said process with one of said series at different frequencies and recording the pressure values to obtain a graph of the sound pressures over the audible range.

9. The method as described in claim 8, wherein said wave trains are sufficiently short as to minimize a sensation of tone.

10. The method as described in claim 8, wherein said wave trains are spaced from each other with sufficient spacing that the effects of one train essentially dies out before the other is generated.

11. The method of testing a person for residual hearing comprising generating a series of wave trains of one frequency at a predetermined amplitude and applying the sound pressures to the ear, generating a second series of wave trains at a second frequency and applying the pressures developed thereby to the same ear, and varying the pressure of the second series of wave trains until the apparent loudness of the two is the same and recording the pressures.

12. The method as described in claim 11, wherein said wave trains are damped waves.

13. The method of measuring residual hearing of an individual which comprises generating a series of audible wave train sound pressure changes each having a controlled rate of change of pressure rise so as to provide a desired spectral distribution, the time interval between said trains of said series being such that no interference occurs, applying said signals to the ear of the individual, varying the amplitude of said pressure changes until the individual determines the threshold of hearing followed by determining the most preferable listening determined in the same manner, recording the results of the two tests and determining the differences between the two tests.

14. The method as described in claim 13, wherein said wave trains are damped waves.

15. The method of measuring most preferable pressures for the hearing of an individual which comprises applying a series of damped audible wave train pressure changes to an ear, each having a controlled rate of change of pressure and a predetermined spectral distribution, the time interval between said trains of said series being such that no interference occurs, varying the amplitude of said pressure changes until the individual determines the most preferable listening pressure.

16. The method of testing for hearing acuity which comprises generating a pair of signals each of which consists of a series of wave trains, each one of said pair being of a different frequency and interposed in time between the signals of the other one of the pair, controlling the amplitude of one of said pair to provide a fixed relation between the amplitudes of said pair, generating sound pressure waves by said signals and applying said sound pressure waves to the ear, said signals being varied in amplitude while maintaining their fixed relation to the point where said signals produce a sensation of equal loudness to the ear.

17. The method as described in claim 16, wherein said trains are damped waves.

18. The method of calibrating a transducer to provide constant output pressure within an audible frequency range which comprises generating a series of electrical wave trains of equal decrement and predetermined frequency, controlling the amplitude of the wave trains to maintain them constant, varying the frequency of said wave trains while maintaining the constant amplitude, measuring the acoustic output of said transducer and determining the variation of amplitude with frequency, adjusting the transducer to provide uniform output in the presence of changes in frequency.

19. The method as described in claim 18, wherein said wave trains are damped waves.

20. A testing apparatus comprising generator means for generating a first signal which is a train of short bursts each burst having a predetermined rate of rise with time and a maximum amplitude and the frequency of which is in the audio frequency spectrum, and for generating a similar signal but of variable rate of rise and amplitude, control means connected to said generator means for energizing and activating said generator means to provide signals in predetermined timed relation to each other, means for maintaining said signals at a predetermined maximum amplitude independently of each other.

21. A testing apparatus as described in claim 20, wherein said generator means generates damped wave trains of predetermined decrement.

22. An apparatus as described in claim 21, wherein the said generator means is constructed to maintain the decrement constant throughout the range of the instrument and wherein the output is connected to a transducer means arranged to maintain it constant in the presence of changes in frequency.

23. An apparatus for the testing of hearing comprising first and second generators for generating trains of short bursts of predetermined frequency and repetition rate in the audio frequency range, common means for activating said generators to cause the wave trains of one of said generators to be substantially equally spaced between those of the other generator, means to change the frequency of at least one of said generators over the audio spectrum, amplifier means connected to each generator to amplify the signals therefrom and to adjust the output amplitude independently of frequency, independent attenuator means connected to the output of said amplifier means to attenuate the output thereof and to indicate the pressure delivered, means connecting the output of the attenuators to a transducer whereby at least one of the signals from the amplifier means is supplied to the transducer and may be attenuated without influencing the delivered pressure of the other signal.

24. An apparatus as described in claim 23, wherein said sound pressure bursts are damped waves of a predetermined decrement.

25. A device for generating signals for testing consisting of a timing and charging circuit including a multivibrator for generating a timing signal, a pulse shaper connected to the output of the multivibrator and arranged to convert said signal into a charging current having a quick cut-off time and adjustable as to amplitude, a ringing circuit, said pulse shaper being connected thereto for charging and releasing the charge in the ringing circuit, said ringing circuit being arranged, upon the release of the charge therein, to produce an oscillatory discharge, and means to provide a signal of a predetermined maximum amplitude, calibrated attenuating means connected to the output to adjust and indicate the signal pressure delivered, a transducer and means for connecting said attenuator to said transducer.

26. An apparatus as described in claim 25, wherein means is provided in the ringing circuit to adjust the damping of said discharge to a predetermined rate or specific value.

References Cited

UNITED STATES PATENTS

| 2,753,397 | 7/1956 | Zwislocki | 179—1.7 |
| 2,869,666 | 1/1959 | Webster | 179—1.7 |
| 3,365,544 | 1/1968 | Cornett | 179—1.7 |
| 3,201,707 | 8/1965 | Aucremanne | 271—166 |

KATHLEEN H. CLAFFY, *Primary Examiner.*

R. P. TAYLOR, *Assistant Examiner.*